US011286039B2

United States Patent
Trenkle et al.

(10) Patent No.: US 11,286,039 B2
(45) Date of Patent: Mar. 29, 2022

(54) MECHANICAL ACTUATOR FOR A HIGH-LIFT SYSTEM OF AN AIRCRAFT

(71) Applicant: LIEBHERR-AEROSPACE LINDENBERG GMBH, Lindenberg (DE)

(72) Inventors: Christian Trenkle, Weiler (DE); Rainer Mielzarek, Weiler-Simmerberg (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 246 days.

(21) Appl. No.: 16/842,794

(22) Filed: Apr. 8, 2020

(65) Prior Publication Data

US 2020/0324879 A1 Oct. 15, 2020

(30) Foreign Application Priority Data

Apr. 9, 2019 (DE) ...................... 10 2019 109 316.3

(51) Int. Cl.
*B64C 13/34* (2006.01)
*G01L 3/10* (2006.01)
*B64C 13/02* (2006.01)

(52) U.S. Cl.
CPC .............. *B64C 13/34* (2013.01); *B64C 13/02* (2013.01); *G01L 3/102* (2013.01)

(58) Field of Classification Search
CPC .......... B64C 13/34; B64C 13/02; G01L 3/102
See application file for complete search history.

(56) References Cited

U.S. PATENT DOCUMENTS

| 2011/0139566 | A1* | 6/2011 | Lang | B64C 13/34 |
| | | | | 192/56.62 |
| 2014/0230570 | A1* | 8/2014 | Kapas | B60K 17/344 |
| | | | | 73/862.193 |
| 2015/0076283 | A1* | 3/2015 | Schievelbusch | B64D 45/00 |
| | | | | 244/99.3 |

FOREIGN PATENT DOCUMENTS

| DE | 102014202735 A1 | 8/2014 |
| DE | 102013206061 A1 | 10/2014 |
| DE | 102013013340 A1 | 2/2015 |
| DE | 202017102174 U1 | 5/2017 |
| DE | 102017002053 A1 | 9/2017 |
| EP | 1774271 B1 | 11/2008 |

OTHER PUBLICATIONS

Search Report issued in corresponding German Patent Application No. 10 2019 109 316.3 dated Dec. 12, 2019 (7 pages).

* cited by examiner

*Primary Examiner* — Justin M Benedik
(74) *Attorney, Agent, or Firm* — Kilyk & Bowersox, P.L.L.C.

(57) ABSTRACT

The invention relates to a mechanical actuator for a high-lift system of an aircraft, wherein the actuator is provided with an internal gearing between an input and an output shaft and comprises an internal sensor for torque measurement, wherein the sensor comprises at least two sensing elements for detecting the input and output torque at separate measuring points, and a common evaluation unit for the at least two sensing elements.

16 Claims, 1 Drawing Sheet

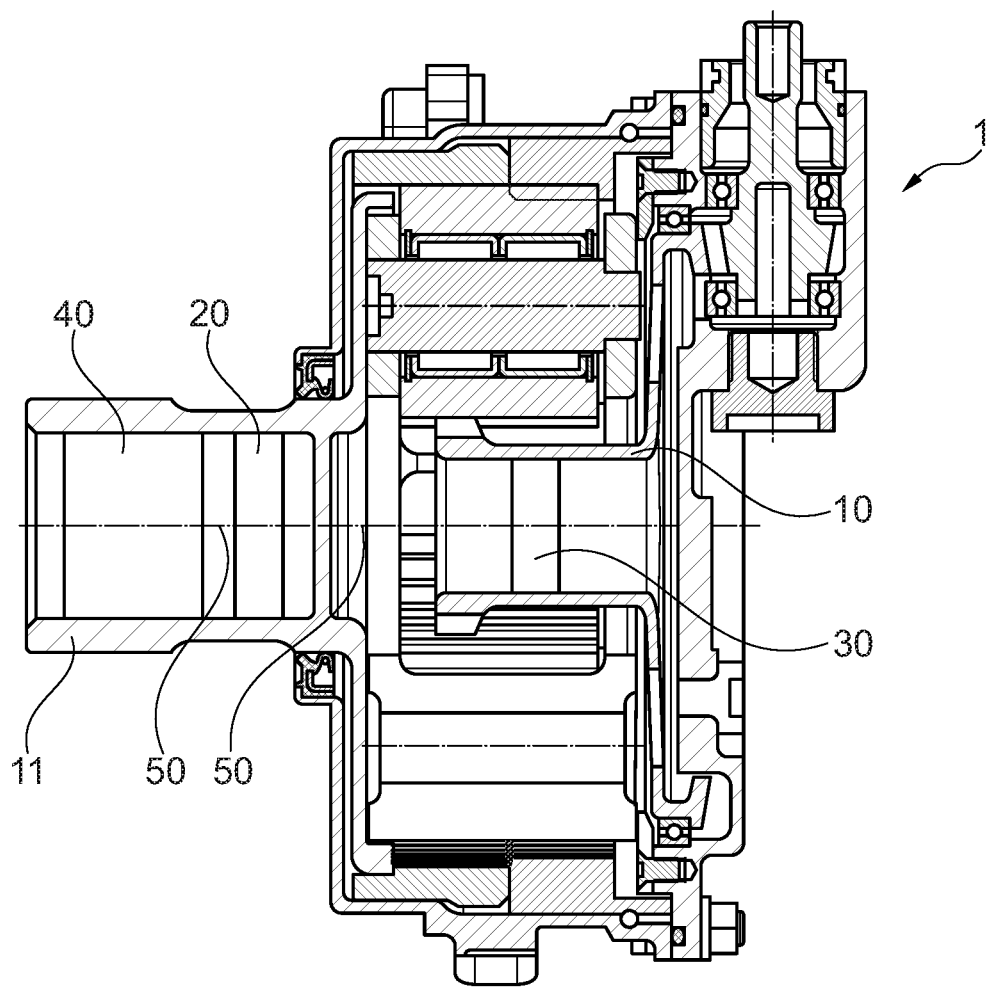

MECHANICAL ACTUATOR FOR A HIGH-LIFT SYSTEM OF AN AIRCRAFT

This application claims priority to German Patent Application No. 10 2019 109 316.3, filed Apr. 9, 2019.

The invention relates to a mechanical actuator for a high-lift system of an aircraft, wherein the actuator is provided with an internal gearing between an input and an output shaft and comprises an internal sensor for torque measurement.

In a high-lift system of an aircraft, mechanical actuators, in particular Geared Rotary Actuators (GRA) are used for driving the individual flaps or groups of flaps. Said actuators are driven by a central drive unit (PCU), via a drive shaft system. In the event of a mechanical blockage in the connection between the flap and the actuator, or even inside the actuator itself, said actuator must absorb the entirety of the drive energy of the central drive unit. This would require the actuator to be of huge dimensions if it were intended to withstand the high forces arising.

For this reason, suitable protection means are provided in the high-lift system, in order to ensure deactivation or disconnection of the drive train in the event of jamming. Hitherto three variants for torque limitation at the actuator are known from the prior art. As a first option, a mechanical torque limiter at the actuator input is proposed. The positioning at the actuator input is advantageous in that the torque to be braked is smaller there, compared with at the actuator output, owing to the gearing. However, the gear efficiency and the fluctuation thereof over the lifetime then has to be taken into account when designing the torque limiter. The drag torque of the gear must also be taken into account. Consequently, the trigger bandwidth of the torque limiter must be relatively high.

Positioning the mechanical to at the actuator output prevents the above problem, but the torque limiter must then be designed so as to be larger, in order to be able to brake the significantly higher torque at the output. In general, a torque limiter of this kind is significantly larger and heavier.

In the recent past, a switch has been made to torque sensors, as an alternative to mechanical torque limitation. The sensor signal is checked for overloading by means of an arithmetic unit and, in the event of jamming, triggers deactivation of the high-lift system. It is conventional to arrange a torque sensor at the actuator output, but this is disadvantageous in that the torque sensor cannot detect jamming in the gear itself. Detection of gear jamming then takes place by means of a torque sensor of the central drive unit (PCU) which is, however, associated with certain inaccuracies. Although it is conceivable to extend this by an additional sensor at the actuator input, this results in doubling of the number of sensors, which has a negative impact on the availability of the high-lift system and on the production costs.

The aim and object of the present application is therefore that of specifying an improved solution, by means of which reliable detection of jamming both in the flap mechanism and in the gear of the actuator itself can be detected.

This object is achieved by a mechanical actuator having the features of claim 1. The dependent claims relate to advantageous embodiments of the actuator.

The starting point is a mechanical actuator for a high-lift system of an aircraft. An actuator of this kind is generally used for transmitting driving power, provided by a central drive unit, to the associated flap, in order to thereby achieve an actuating movement of the flap. Actuators of this kind are generally designed as Geared Rotary Actuators (GRA) and comprise an input and an output shaft which are coupled together by means of a gearing. The main gear set is generally formed by planetary gears.

According to the invention, a torque sensor at least is then integrated into the actuator, at least in part. The sensor is equipped with at least two sensing elements which are arranged at different measuring points within the actuator. The sensing elements are used for tapping a corresponding measuring signal at the associated measuring point, which measuring signal is indicative of a torque that is present there. The torque at the input of the actuator can be determined by means of one sensing element, and the torque at the output of the actuator can be determined by means of the further sensing element. The sensor furthermore comprises a common evaluation unit for the at least two sensing elements, which evaluation unit is integrated into the actuator, at least in part.

An evaluation unit of this kind receives and processes the signal of the sensing elements. The sensor signal relating to the determined torque can be conveyed to a superordinate controller of the high-lift system or to the flight control means of an aircraft, by means of at least one, preferably two, outputs of the evaluation unit.

The novel actuator comprising an integrated sensor now makes it possible, for the first time, to determine both the input and the output torque at the actuator. This can be achieved by means of one single sensor, which was supplemented only by one further measuring point or sensing element. In contrast to the use of two separate sensors, the production costs arising can be reduced to a minimum.

It is advantageous for the measuring point for the torque prevailing at the input of the actuator to be located in the region of the input shaft of the actuator. Alternatively thereto, the measuring point can also be implemented in the region of the sun wheel of the main gear stage of the actuator. The measuring point for the torque prevailing at the output of the actuator is advantageously integrated in the region of the output shaft of the actuator.

According to a preferred embodiment, the at least one sensing element operates in accordance with a magneto-restrictive principle. The sensing element consists of at least one receiver coil, in particular a coil pair, for detecting a magnetic field change in the detection region. The magnetic field change is brought about by appropriate magnetization of the component that rotates at the torque to be determined.

For example, for the measuring point of the input torque, magnetization can be introduced into the input shaft of the actuator, in particular in the internal diameter of the input shaft of the actuator. Magnetization of the sun wheel of the main gear stage of the actuator is also possible, and in this case, too, the magnetization is preferably introduced into the internal diameter of the sun wheel. The associated at least one coil or the coil pair of the sensing element is then mounted in the region of the magnetization, preferably by means of a fixed retainer in the region of the shaft or of the sun wheel.

For the measuring point of the output torque, appropriate magnetization can be introduced into the output shaft, preferably the internal diameter of the output shaft, of the actuator. The associated at least one coil or the coil pair is attached in the region of the output shaft, by means of a retainer.

Overall, the design according to the invention of the sensor comprising one single evaluation unit but two measuring points and corresponding sensing elements concedes only a comparatively small reduction in the availability of the overall system, since only the magnetization, the coil pair, and possibly certain components of the wiring have to be provided in duplicate. The majority of the sensor components can, however, be designed in a simplex manner. This relates in particular to the design of the evaluation unit. As a result, a significant cost saving compared with a solution having two separate sensors is also possible.

The at least two sensing elements are preferably connected to the common evaluation unit via cable links. In this case, it has been found to be advantageous for said cable links to be laid from the relevant sensing element within the internal diameter of the input shaft or the sun wheel and/or the output shaft, to the evaluation unit.

If the output shaft provides sufficient space, then the evaluation unit can also be integrated in the internal diameter there.

According to a specific embodiment, the evaluation unit provides at least two input interfaces for connecting the at least two sensing elements. Furthermore, it is optionally also possible for two separate amplifier stages, i.e. one dedicated amplifier stage per input interface, to be provided, in order to amplify the input signals of the sensing elements individually, to the required signal level. Owing to the gear reduction, and the resulting significant torque difference, the measuring ranges of the two measuring signals may be very far apart from one another. The separate amplifier stages make it possible, if necessary, to compensate for this difference by means of different signal amplification.

In contrast to the dual design of the input interfaces and/or the amplifier stages, the remaining components of the evaluation unit are preferably formed so as to be simplex. In particular, the evaluation unit comprises just one single power supply and/or one single housing and/or one single receptacle for the purpose of mounting inside the actuator and/or a single carrier board for the necessary electronics and/or common protection elements for all the sensing elements.

Depending on the specific strategy for incorporating the evaluation unit into a superordinate control environment, the evaluation unit may be designed in an individual manner. For example, it is possible to provide the torque measured values of the individual sensing elements to a superordinate controller by means of separate outputs of the evaluation unit. The evaluation unit provides the amplified and optionally further processed signal of the sensing element for the input torque via a first output, while the amplified and optionally further processed signal of the sensing element for the output torque is provided by the second output of the evaluation unit. It is alternatively possible for providing the evaluation unit with just one single signal output. In such a case, the evaluation unit comprises suitable internal logics that is configured to superimpose the input signals of the at least two sensing elements. The superimposed signal, in particular the differential signal of the two measuring signals, can then be tapped at the single signal output of the evaluation unit, by means of a superordinate controller. In the event of superimposition and corresponding difference formation, it is essential to adjust the weaker torque signal of the actuator input by means of amplification of a larger magnitude on the measuring signal of the actuator output.

In addition to the actuator according to the invention, the invention also comprises a high-lift system for an aircraft which is provided with at least one actuator according to the invention for actuating at least one flap. Accordingly, the same advantages and properties result for the high-lift system as have already been set out above, with reference to the actuator.

It is furthermore advantageous for a superordinate controller of the high-lift system to be provided, which controller is programmed so as to separately tap the individual signals provided at the two outputs of the evaluation unit, and to compare said signals with individual threshold values. As a result, jamming can be reliably detected. It is furthermore possible to locate the jam, i.e. to distinguish whether this occurs in the actuator itself or in the subsequent connection between the actuator and the flap kinematics.

It is alternatively possible, in the event of the actuator comprising an evaluation unit having just one signal output, for the superordinate controller to compare the superimposed signal tapped there, in particular the difference signal between the delivered signals of the at least two sensing elements, to an associated threshold value.

The invention also relates to an aircraft comprising a high-lift system according to the invention, and therefore an aircraft of this kind has the same advantages and properties as the high-lift system or the actuator according to the invention. Therefore, a repeated description is omitted.

Further advantages and details of the invention will be set out in the following, with reference to an embodiment of the actuator that is shown in the single FIGURE.

The FIGURE shows a cross section through a Geared Rotary Actuator (GRA) 1. Said GRA 1 comprises an internal torque sensor which is located in the internal diameter of the output shaft 11, at least in part. An essential component of the torque sensor is the evaluation electronics 40 which is received completely within the internal diameter of the output shaft 11 of the actuator 1.

According to the invention, said sensor 40 is now equipped with two sensing elements, i.e. separate coil pairs, which are positioned at different measuring points 20, 30 within the actuator 1. The input torque of the actuator 1 present at the input shaft 10 is intended to be determined via the measuring point 30, while the output torque present at the output shaft 11 of the actuator 1 is intended to be measured by means of the integral measuring point 20.

In this case, the sensing elements are designed in the form of a coil pair, which cannot be seen in the FIGURE. Each coil pair is mounted in a stationary manner inside the actuator 1, by means of a retainer, in the direct vicinity of the associated measuring point 20, 30. A change in a magnetic field brought about by the rotation of the input or output shaft 10, 11 is intended to be determined by the sensing element, on the basis of a magneto-restrictive measuring principle. A magnetic field of this kind is generated in the region of the measuring point 30 by means of magnetization in the region of the internal diameter of the input shaft 30. The rotation of the shaft 30 results in the change of the magnetic field prevailing there. As an alternative to the input shaft 10, the magnetization could also be introduced in the internal diameter of the sun wheel of the main gear stage. The implementation for the measuring point 20 is similar. In this case, the necessary magnetization is introduced into the internal diameter of the output shaft 11.

The relevant measuring point, in particular the coil pair mounted there, is connected to the evaluation unit 40 by means of a cable 50. The cable routing likewise takes place within the internal diameter of the relevant shaft.

Identification of jamming takes place in a manner similar to that described in DE 10 2017 00 2053 A1, and reference is made to the entirety thereof at this point. The measured value is tapped by a superordinate controller, at the evaluation unit, and compared with a stored threshold value. In the event of the threshold value being exceeded, for example the high-lift system is deactivated or brought into a safe state.

The evaluation of the two measuring points 20, 30 can take place in different manners.

According to option A, the two signals of the measuring points 20, 30 or the coil pair arranged there are superimposed within the evaluation electronics 40 and provided to a superordinate controller at a single output of the evaluation electronics 40. Said controller then compares the single signal with an associated threshold value. Since the two measuring regions of the two measuring points 20, 30 are generally very far apart (owing to the gearing), the measuring signal of the measuring point 30 has to be amplified more, by the internal amplifier of the evaluation electronics 40, than is the case for the signal of the measuring point 20, in order to generate a corresponding jam indication here.

As an alternative to a superimposition of the measuring points, the evaluation electronics 40 can also be provided with two outputs and two separate amplifier stages, as a result of which the signals of the measuring points 20, 30 are provided to the superordinate controller by means of two separate outputs of the evaluation electronics 40. Said controller can then compare the separate measured values with separate threshold values.

Owing to the two measuring points 20, 30, in order to process the two measuring points 20, 30 the evaluation electronics 40 requires only one doubled input interface for connecting the sensing element, and a doubled amplifier stage. In contrast, the power supply, the mechanization of the evaluation electronics 40 and the housing and mounting receptacle thereof, an internal carrier board for the two measuring points, and any protection elements, can be designed so as to be simplex. Depending on the desired evaluation of the measuring signals, the evaluation electronics 40 is provided with one or two outputs.

The actuator according to the invention comprising the integrated sensor 40 then makes it possible to identify all instances of jamming, from the region of the input of the actuator as far as the flap kinematics. Just one single sensor is required for measuring the input and the output torque at the actuator 1. Mechanical torque limitation, as in conventional high-lift systems, can be entirely omitted here. Since only magnetization and the coil pair has to be provided twice, a slight reduction in the availability of the overall system must be accepted. This also results in a cost saving, since many components of the sensor 40 are formed so as to be simplex. Furthermore, complete integration of the sensor into the actuator 1 is achieved, since the two measuring points, and the associated evaluation electronics 40, can be placed completely in the actuator 1.

The invention claimed is:

1. Mechanical actuator for a high-lift system of an aircraft, wherein the actuator is provided with an internal gearing between an input and an output shaft and comprises an internal sensor for torque measurement,
and
the sensor comprises at least two sensing elements for detecting the input and output torque at separate measuring points, and a common evaluation unit for the at least two sensing elements.

2. The actuator according to claim 1, wherein the measuring point for the input torque is provided in the region of the input shaft and/or in the region of the sun wheel of the main gear stage of the actuator.

3. The actuator according to claim 1, wherein the measuring point for the output torque is provided in the region of the output shaft of the actuator.

4. The actuator according to claim 1, wherein the sensing elements operate in accordance with a magneto-restrictive principle and comprise at least one coil pair for detecting a magnetic field change.

5. The actuator according to claim 4, wherein for the measuring point of the input torque, magnetization is introduced into the internal diameter of the input shaft of the actuator and/or of the sun wheel of the main gear stage of the actuator.

6. The actuator according to claim 4, wherein, for the measuring point of the output torque, magnetization is introduced into the internal diameter of the output shaft of the actuator.

7. The actuator according to claim 1, wherein the at least two sensing elements are connected to the common evaluation unit by means of a cable link, wherein the cable link extends from the relevant sensing element within the internal diameter of the input shaft and/or of the sun wheel and/or of the output shaft, to the evaluation unit.

8. The actuator according to claim 1, wherein the evaluation unit is located within the internal diameter of the output shaft.

9. The actuator according to claim 1, wherein the evaluation unit for the at least two sensing elements provides at least two input interfaces for the at least two sensing elements, and preferably at least two amplifier stages for the input signals.

10. The actuator according to claim 1, wherein the power supply and/or the housing and/or a receptacle for integrating the evaluation unit within the actuator and/or a carrier board and/or protection elements are provided once, for the at least two sensing elements, within the evaluation unit.

11. The actuator according to claim 1, wherein the evaluation unit comprises at least two outputs, in order to provide the measuring signals of the at least two sensing elements, via separate outputs, to a superordinate controller.

12. The actuator according to claim 1, wherein the evaluation unit comprises internal logics that is configured to superimpose the input signals of the at least two sensing elements, wherein the evaluation unit provides a single output, in order to provide the superimposed signal to a superordinate controller.

13. The high-lift system according to claim 12, wherein a superordinate controller is provided which is programmed so as to tap the individual signals at the at least two outputs of the evaluation unit, and to compare these with individual threshold values associated with the relevant sensing elements, or to tap a superimposed signal at the single output of the evaluation unit, and to compare this with one threshold value.

14. An aircraft comprising the high-lift system according to claim 13.

15. High-lift system for an aircraft, comprising at least one actuator according to claim 1.

16. An aircraft comprising the high-lift system according to claim 15.

* * * * *